(12) United States Patent
McDonough

(10) Patent No.: US 6,836,781 B2
(45) Date of Patent: Dec. 28, 2004

(54) METHOD FOR STREAMLINED REPRESENTATION OF ROADS IN A GEOGRAPHIC DATABASE

(75) Inventor: William McDonough, Glen Ellyn, IL (US)

(73) Assignee: Navteq North America, LLC, Chicago, IL (US)

( * ) Notice: Subject to any disclaimer, the term of this patent is extended or adjusted under 35 U.S.C. 154(b) by 283 days.

(21) Appl. No.: 10/244,269

(22) Filed: Sep. 16, 2002

(65) Prior Publication Data

US 2004/0054687 A1 Mar. 18, 2004

(51) Int. Cl.⁷ .............................................. G06F 17/30
(52) U.S. Cl. ............................ 707/104.1; 707/3; 707/1
(58) Field of Search .................... 707/1–10, 100–104.1; 701/117–119, 200–202, 209, 212; 705/14

(56) References Cited

U.S. PATENT DOCUMENTS

| | | | |
|---|---|---|---|
| 6,026,384 A | 2/2000 | Poppen | 705/400 |
| 6,421,659 B1 | 7/2002 | Nomura | 707/3 |
| 6,430,499 B1 | 8/2002 | Nakano et al. | 701/208 |
| 6,480,783 B1 * | 11/2002 | Myr | 701/117 |
| 6,708,112 B1 * | 3/2004 | Beesley et al. | 701/209 |

* cited by examiner

Primary Examiner—Charles Rones
Assistant Examiner—Neveen Abel-Jalil
(74) Attorney, Agent, or Firm—Frank J. Kozak; Jon D. Shutter; Lawrence M. Kaplan

(57) ABSTRACT

A method of representing a road network in a geographic database that facilitates determining routes between locations along the road network. In the geographic database, the road network is represented using transition point pair data. Each transition point pair data record indicates an entry point, an arm (or road segment) leading away from the entry point, an exit point, routing attributes (such as a travel cost or time), and possibly other data. Except for certain exceptions, such as multi-segment restricted driving maneuvers, the entry point and the exit point of a transition point pair are adjacent decision point intersections. A decision point intersection is an intersection at which a driver is required to make a decision which one of two or more possible road segments to take leading away from the intersection. The transition point pair data are used when calculating a route between two locations.

21 Claims, 10 Drawing Sheets

ACTUAL ROADS

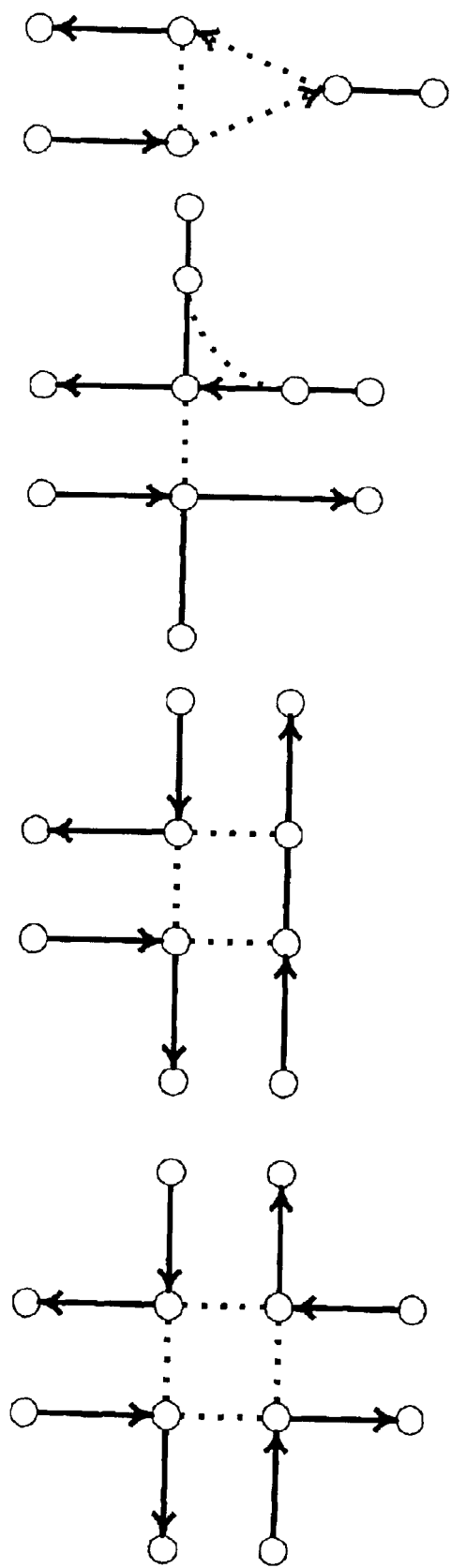

METHOD FOR STREAMLINED REPRESENTATION OF ROADS IN A GEOGRAPHIC DATABASE

The present invention relates to geographic data and more particularly the present invention relates to a way to represent a road network in a geographic database to facilitate certain navigation-related functions, such as route calculation.

Navigation systems provide useful features, such as calculating a route to a desired destination and providing guidance for following the route. In order to provide these features, navigation systems use geographic databases that include information about the locations of roads and intersections, estimated travel times along roads, the speed limits along roads, etc. Geographic databases used by navigation systems also include data about traffic restrictions, such as one-way streets, no-left-turns, etc., so that the navigation system can calculate a legal route (i.e., a route that conforms to applicable traffic laws and regulations). Using a geographic database, programming algorithms used in navigation systems can find an optimal (e.g, fastest or shortest) route to a specified destination.

A conventional way to represent roads in a geographic database is to represent them as discrete segments, i.e., wherein a segment corresponds to the portion of a road between intersections. In this kind of model, traffic restrictions (such as turn restrictions) are treated as properties of a road segment. This model conforms to the way roads are perceived and generally works well.

FIG. 1 is an illustration of a portion of a road network 10. FIG. 2 is a diagram that illutrates how the road network 10 shown in FIG. 1 is represented in a conventional geographic database 14.

In some geographic databases, a series of connected individual road segments are represented as an aggregation in order to facilitate some types of functions for which geographic databases are used. Examples of geographic databases in which a series of connected road segments are represented as an aggregation are disclosed in U.S. Pat. Nos. 6,038,559 and 6,112,200, the entire disclosures of which are represented by reference herein.

Although the conventional way of representing roads works well, there is room for improvement. For example, calculating a route using a geographic database can be computationally intensive. It would be beneficial if roads could be represented in a geographic database in a way that further facilitates certain functions, such as route calculation.

SUMMARY OF THE INVENTION

To address these and other objectives, an embodiment of the present invention comprises a method of representing a road network in a geographic database that facilitates determining routes between locations along the road network. In the geographic database, the road network is represented using transition point pair data. Each transition point pair data record indicates an entry point, an arm (or road segment) leading away from the entry point, an exit point, routing attributes, and possibly other data. Except for certain exceptions, such as multi-segment restricted driving maneuvers, the entry point and the exit point of a transition point pair are adjacent decision point intersections. A decision point intersection is an intersection at which a driver is required to make a decision which one of two or more possible road segments to take leading away from the intersection. The transition point pair data are used when calculating a route between two locations.

BRIEF DESCRIPTION OF THE DRAWINGS

FIGS. 13A–13D show examples of complex intersections that are represented using an alternative embodiment.

DETAILED DESCRIPTION OF THE PRESENTLY PREFERRED EMBODIMENTS

I. Formation of Compiled Geographic Databases from a Master Geographic Database.

Figure 3:
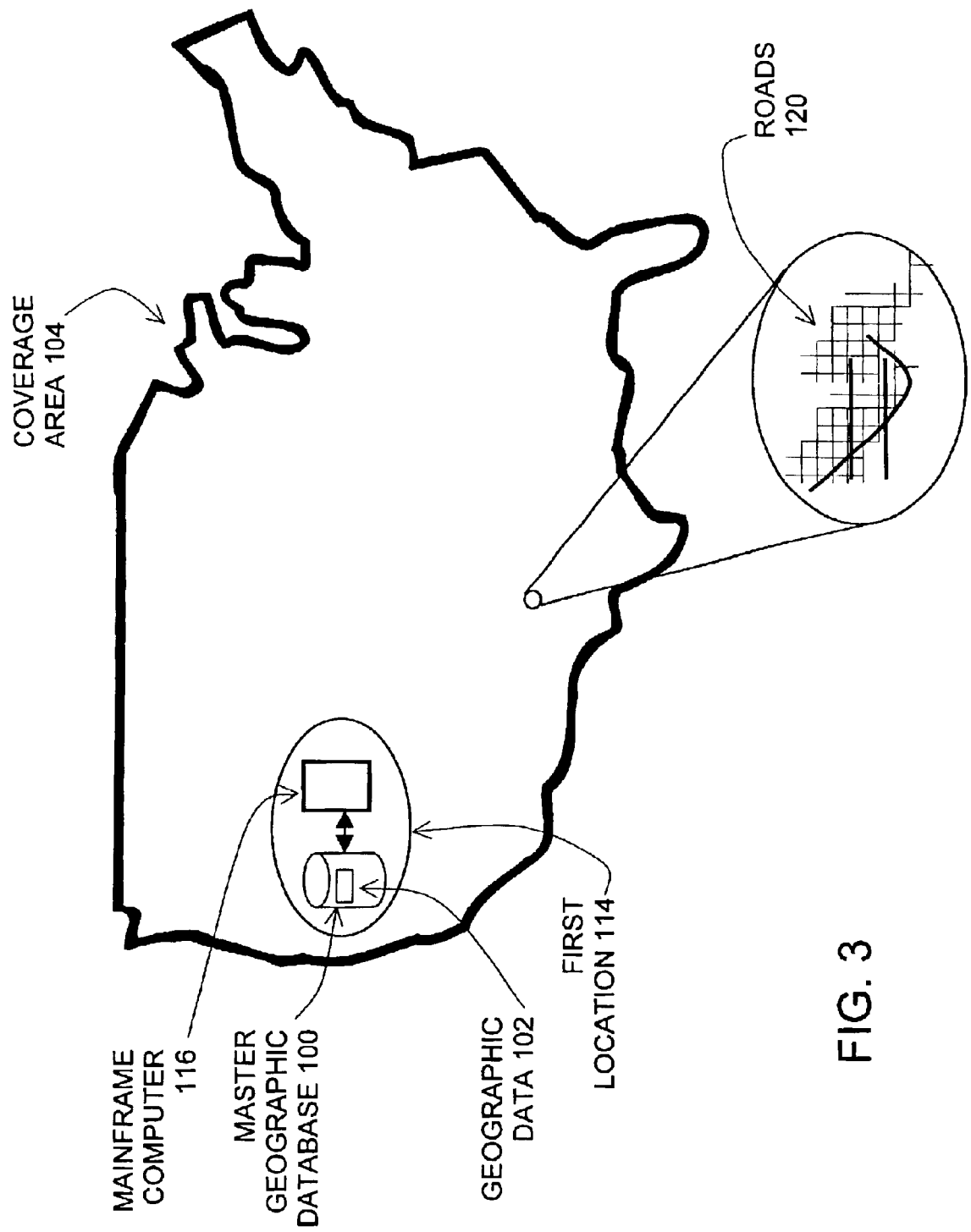
FIG. 3 is a diagram that illustrates a relationship between a master version of a geographic database and a coverage area.

FIG. 3 shows a master version of a geographic database 100. The master version of the geographic database 100 contains data 102 that represent geographic features in a coverage area 104. The coverage area 104 may correspond to an entire country, such as the United States. Alternatively, the coverage area 104 may correspond to several countries, such as the United States, Canada, and Mexico, or France, Germany, and Italy, and so on. According to another alternative, the coverage area 104 of the master version of the geographic database 100 may represent only a single region within a country, such as the West Coast or the Midwest of the U.S. Although the master version of the geographic database 100 includes data that represent geographic features in the entire coverage area 104, there may be parts of the coverage area 104 that contain geographic features that are not represented by data in the geographic database, or for which the representation of geographic features is sparse.

The master version of the geographic database 100 includes data about a road network 120 located in the coverage area 104. The data about the road network 120 include various kinds of information, such as the geographic coordinates of positions of the roads, street names of the roads, addresses ranges along the roads, turn restrictions at intersections of roads, and so on. The master version of the geographic database 100 also includes data about points of interest in the covered area 104. Points of interest may include hotels, restaurants, museums, stadiums, offices, automobile dealerships, auto repair shops, etc. The master version of the geographic database 100 may include data about the locations of these points of interests. The master version of the geographic database 100 may also include data about places, such as cities, towns, or other communities. The master version of the geographic database 100 may include other kinds of information.

The data about the geographic features in the coverage area 104 are collected by a geographic database developer, such as Navigation Technologies Corporation of Chicago, Ill. However, it is understood that the inventive concepts disclosed herein are not restricted to any particular source of data.

The master version of the geographic database 100 is maintained as the copy that has the most up-to-date data relating to the coverage area 104. Accordingly, the master version of the geographic database 100 is updated, expanded, and/or otherwise modified on a regular and continuing basis. To facilitate these operations, the master version of the geographic database 100 is stored in a format that facilitates updating, maintenance, and development. In general, the format of the master database 100 is not suitable for use in navigation systems.

A copy of the master version of the geographic database 100 is physically located at a first location 114. In one embodiment, the master version of the geographic database 100 is stored on one or more hard drives, tapes or other media, and accessed with an appropriate computer 116. Any suitable computer may be used, such as a mainframe computer, a plurality of networked microcomputers, etc.

Figure 4:
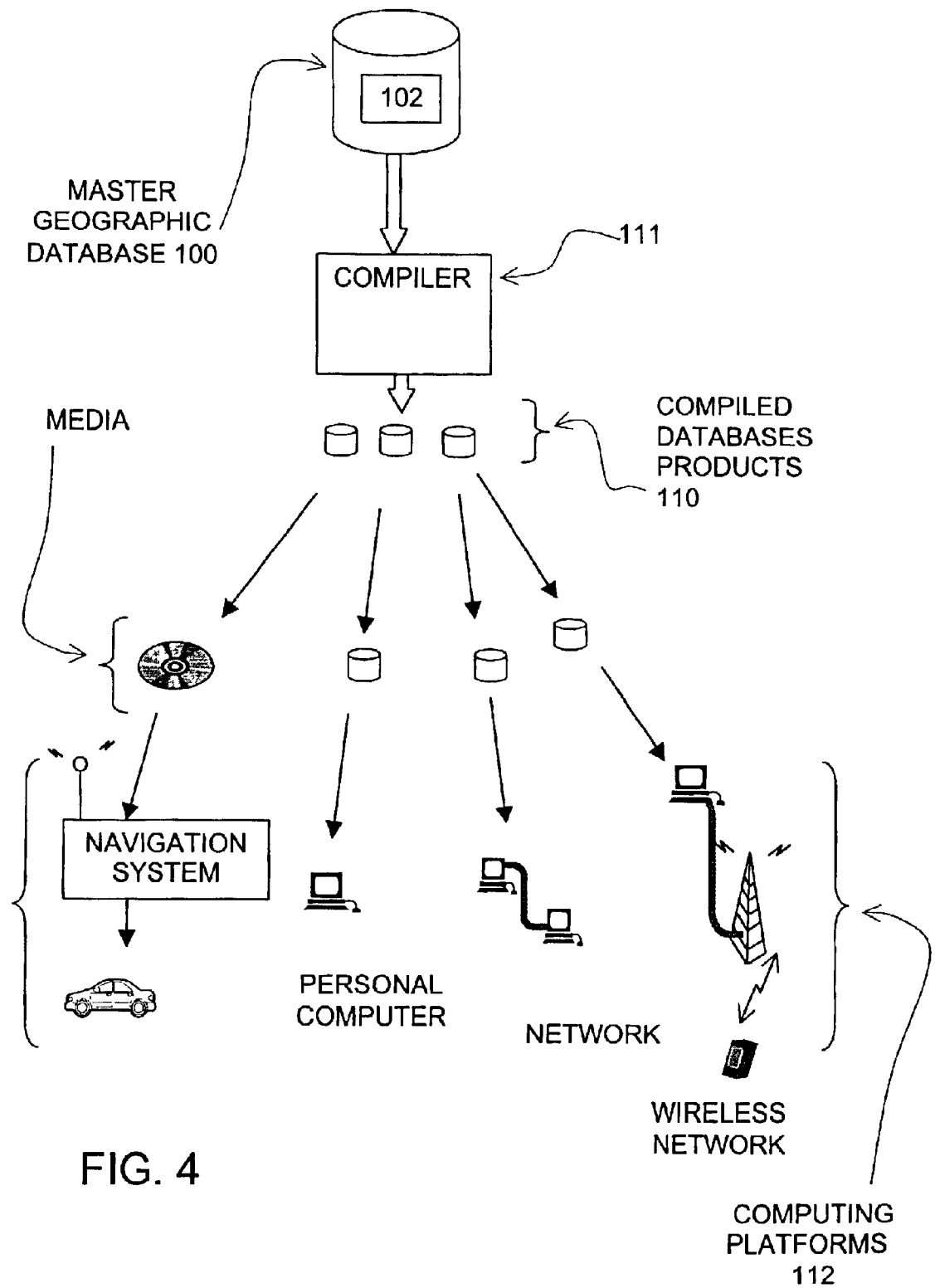
FIG. 4 is a diagram that illustrates formation of compiled geographic database products from the master version of the geographic database shown in FIG. 3.

Referring to FIG. 4, the master version of the geographic database 100 is used to make compiled (or derived) database products 110. The compiled database products 110 are made using a compiler 111. The compiler 111 is a software program run on an appropriate computer platform.

The compiled database products 110 may represent only portions of the coverage area represented by the master version of the geographic database 100. For example, the compiled database products 110 may include data that relate to only one or more specific sub-areas within the coverage area 104 of the master version of the geographic database 100. Further, the compiled database products 110 may include fewer than all the data attributes that describe geographic features represented in the master version of the geographic database 100.

The compiled database products 110 are used on various kinds of computing platforms 112. For example, the compiled database products 110 are used in navigation systems (such as in-vehicle navigation systems and hand-held portable navigation systems), personal computers (including desktop and notebook computers), and other kinds of devices, such as PalmPilot®-type devices, pagers, telephones, personal digital assistants, etc. The compiled database products 110 are also used on networked computing platforms and environments, including systems connected to the Internet.

The compiled database products 110 are stored on media that are suitable for the hardware platforms on which they are used. For example, the compiled database products may be stored on CD-ROM disks, hard drives, DVD disks, flash memory, or other types of media that are available now or that become available in the future.

On the computing platforms 112, the compiled database products 110 are used by various software applications. For example, the compiled database products 110 may be used by software applications that provide navigation-related functions, such as route calculation, route guidance, vehicle positioning, map display, and electronic yellow pages, as well as other kinds of functions.

II. Representation of Roads in Compiled Geographic Databases

In the compiled databases 110, the geographic data are organized differently than in the master version of the geographic database 100. A compiled database is organized, arranged, structured and/or stored in a form that facilitates the use of the data in the computing platform in which it is installed. A compiled database may also be stored in a compressed format on the media on which it is located.

A. Separate Functional Types of Geographic Data

Figure 5:
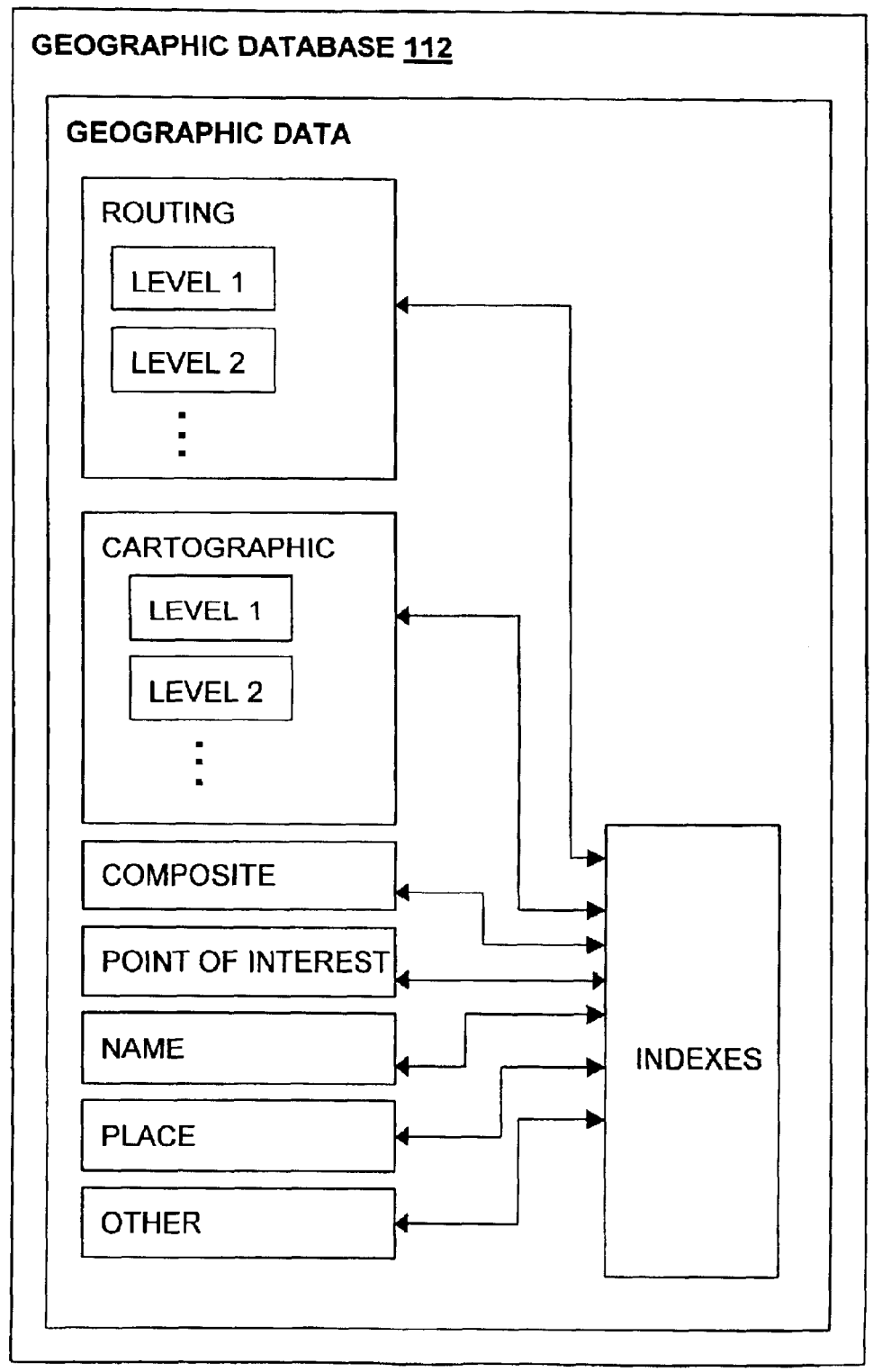
FIG. 5 is a block diagram that shows an organization of one of the compiled databases in FIG. 4.

One way to facilitate performance of navigation-related functions is to provide separate collections or subsets of the geographic data for use by specific navigation-related functions. Each such separate collection includes the data and attributes needed for performing the particular associated function, but excludes data and attributes that are not needed for performing the function. FIG. 5 illustrates one way of providing separate subsets of geographic data based on function. In FIG. 5, the compiled geographic database 110 is comprised of separate collections of routing data, cartographic data (for map display), maneuver data (for route guidance), point-of-interest data, and so on. The compiled geographic database 110 may be defined with fewer or more of these different types of data, and other types of data may be defined and included. In addition, one or more of these different types of data (or levels thereof, as explained below) may be combined into a composite type. To permit these subsets of data types to work together, one or more indexes are included that provide cross references, search trees, or other data finding techniques.

B. Levels of Geographic Data

Another way that the data in a compiled geographic database can be organized to enhance the use thereof is to provide the data in levels. Some of the navigation-related functions, such as the map display function and the route calculation function, may use data at different levels of detail. To implement different levels of data, each represented road segment is associated with a rank that corresponds to a functional class of road. Road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes. For example, these may include side streets, alleyways, etc.

The rank of a represented road is used to specify the highest data level in which a data entity that represents the road is included. For example, referring to FIG. 5, the routing type data may include separate levels of the data, "level 0", "level 1", etc., each comprising a separate collection of the routing data with a different level of detail, and each of which can be used by the route calculation function. In the routing type of data, level 0 includes the data records that represent roads having a rank of "0" or higher, thus, level 0 includes data corresponding to all the represented portions of all the roads in the geographic region. Level 1 of the routing data comprises a separate subset (or collection) of the routing data and includes only the data that represent roads having a rank of "1" or higher. Level 2 of the routing data comprises a separate subset of the routing data and includes only the data that represent roads having a rank of level 2 or higher, and so on. A highest level includes only records that represent roads having a rank of n. Each higher level includes fewer records, however these records represent roads upon which travel is generally faster. Route calculation may be facilitated by using the higher levels of routing data, whenever possible, e.g., for portions of a route away from the origin or destination.

Similarly, some of the other types of data may be provided in different levels which can be used by the associated function. For example, using different levels of cartographic data facilitates panning and zooming by the map display function.

Although the organization of some of the data into levels results in some duplication of the data, the increased efficiency generally offsets any disadvantages. In order to allow these different levels to work together, indexes may be provided.

In addition to the above-described method for organizing a subset of a geographic database that represents roads into separate levels, there are other methods that can be used. For example, another way to organize roads into levels is to use a different criterion, provided connectivity is maintained at each level. In practice, that might involve moving selected roads from one level to another to improve route quality. The same result could be accomplished by changing the rank of selected roads.

C. Data Representation of Road Network for Routing

As mentioned above, the geographic database 110 includes a specific portion or subset used for route calculation. In prior geographic databases, the subset of data used for route calculation contained road segment data (representing individual road segments) and node data (representing intersections or endpoints of road segments). In a present embodiment, the subset of data used for route calculation includes node data that represent intersections of roads. However, in the present embodiment, the subset of data used for route calculation includes transition point pair data instead of road segment data. As explained in more detail below, the transition point pair data does not represent individual road segments.

(For purposes of helping to explain the disclosed embodiments, reference may be made to the "road segments," "links" or "intersections" included in a transition point pair or the "path" of a transition point pair. These references are for explanation purposes and should not be construed to mean that the transition point pair data includes actual references to specific road segments, except as disclosed herein.).

Each "transition point pair" includes an entry point, an associated exit point, and an associated cost. When calculating a route, the transition point pair data are used to determine the costs (e.g., travel times) associated with traveling to exit points from associated entry points. In a present embodiment, the transition point pair data do not indicate the exact path (i.e., the specific individual road segments) by which the exit point can be reached from the entry point. In order to determine the exact path between an entry point and an exit point, reference is made to another of the types of data in the geographic database. However, determining the exact path between an entry point and an exit point (and, by extension, of a route made up of actual road segments) can be performed after a skeleton version of the route (made up of transition point pairs) is calculated, thereby reducing the amount of time needed to calculate a complete route. Detailed data is not needed to determine a route, only to highlight or follow it.

In a present embodiment, most of the entry points and exit points correspond to decision point intersections. A "decision point intersection" is an intersection of more than two road segments where a driver entering the intersection along one of the road segments can legally exit the intersection via at least two other road segments, i.e., the driver has to make a "decision" which one of two or more road segments to follow out of the intersection.

Whether an intersection is a decision point intersection depends on the road segment upon which the intersection is being entered. For example, a driver entering an intersection along one road segment, e.g., segment A, may have the option of turning left onto segment B, going straight onto segment C, or turning right onto segment D. Thus, the intersection is a decision point intersection when approached on segment A. However, a driver entering the same intersection along segment B may only have the option of going straight onto segment D. In this case, the intersection is not a decision point intersection when being approached on segment B.

In a transition point pair, the entry point is a decision point intersection. The exit point of a transition point pair is the next eligible decision point intersection that a driver would encounter after leaving the entry point along the chosen one of the road segments leading away from it. A decision point intersection is eligible unless it is:

(1) part of a restricted driving maneuver;
(2) the start of a one-way condition in the direction opposite to the direction toward the exit point;
(3) the start of a timed one-way condition; or
(4) the start of a no-through-traffic condition.

Some of these exceptions are explained in more detail below.

Between the entry point and the exit point of a transition point pair, there may be one or more intersections or there may be no intersections. Thus, there may be more than one actual road segment between the entry point and the exit point of a transition point pair. Furthermore, the same actual road segment may be part of two different transition point pairs.

Figure 6:
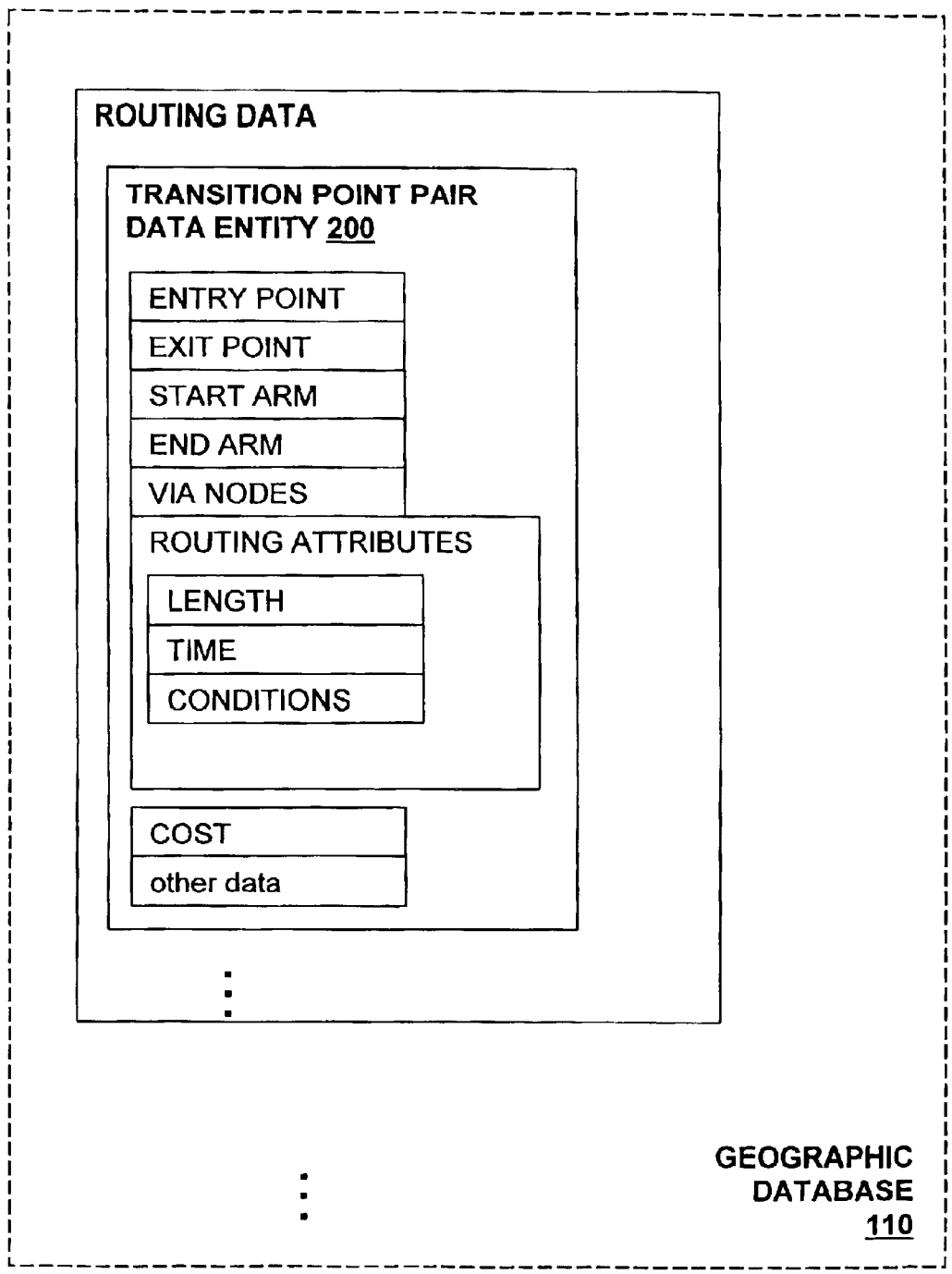
FIG. 6 is a block diagram that shows components of a data representation of one of the road segments (links) shown in FIG. 5 according to a first embodiment.

In the subset of the geographic database used for route calculation, each transition point pair is represented by a separate data entity or record. FIG. 6 illustrates the components of a transition pair data entity 200. Each transition point pair data entity 200 includes data that indicate the entry point, the exit arm from the entry point (labeled "START ARM" in FIG. 6) and the exit point. In this embodiment, the entry point is indicated by the ID of the node that corresponds to the entry point. The exit arm is indicated by a number (e.g., 1, 2, etc.) assigned to each of the road segments that connect to the node corresponding to the entry point. The numbers may be assigned to each road segment in clockwise order starting from a direction, e.g., north. The exit point is indicated by the ID of the node that corresponds to the exit point.

In the present embodiment, the transition point pair data entity also includes data indicating the segment leading into the exit point (labeled "END ARM" in FIG. 6). In the present embodiment, the road segment leading into the exit point is indicated by arm number.

If the transition point pair data entity includes a "via node," as explained below, data indicating the via node is included in the transition point pair data entity.

If the transition point pair data entity includes "conditions," as explained below, data indicating the conditions are included in the transition point pair data entity.

The transition point pair data entity also includes a set of routing attributes. These routing attributes include the total length of the road segments between the starting point and the exit point, the average time it takes to travel from the starting point to the exit point, vehicle access information, and cost modification attributes.

A transition pair data entity may include other data components.

(The terms "transition point pair" and "node" represent only one terminology for describing these concepts. In alternative embodiments, a "transition point pair" may be referred to by another term. A "transition point pair" may even be referred to as a "segment." It is understood that the inventive concepts are not limited to any specific terminology.)

EXAMPLES

Figure 1:
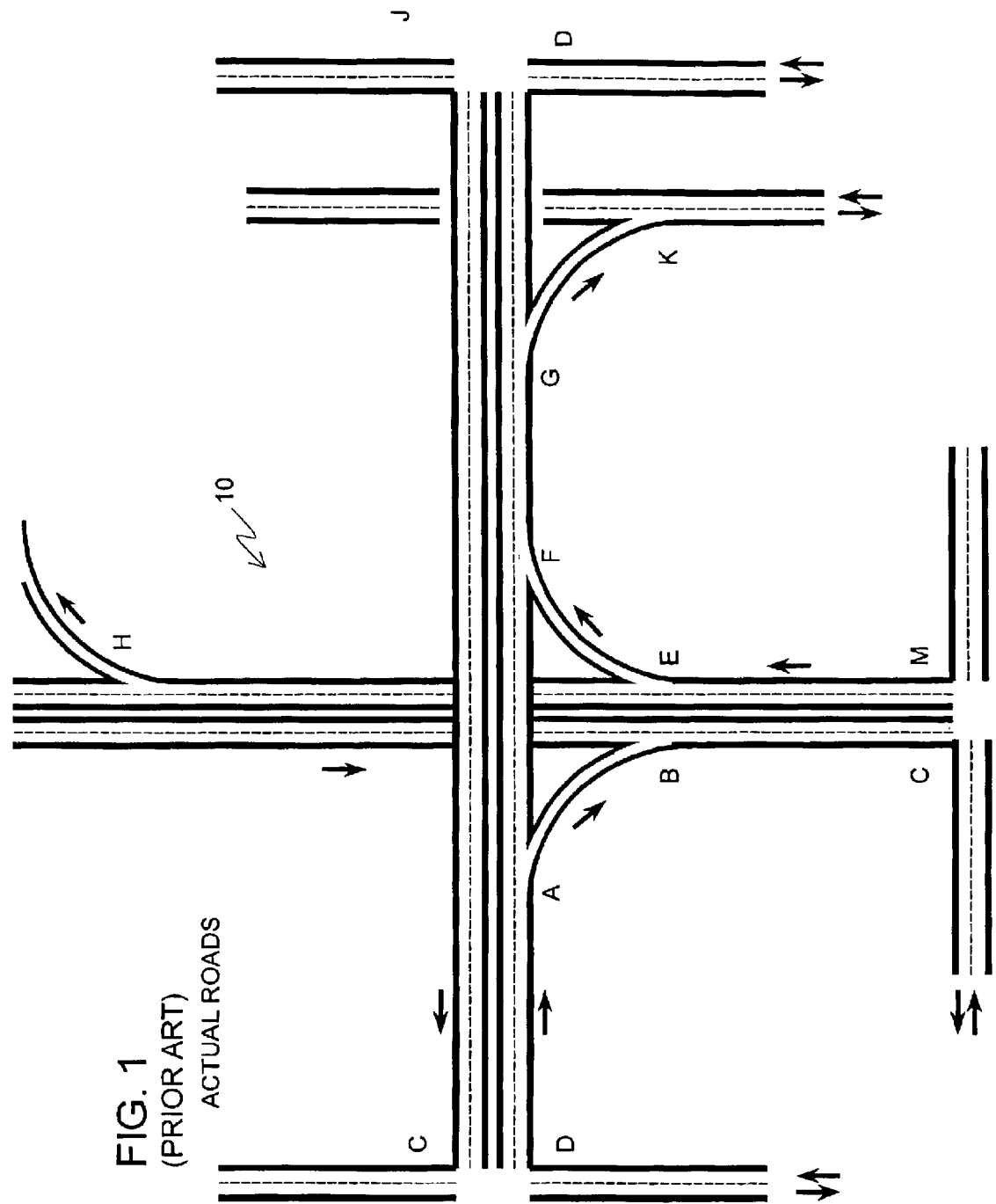
FIG. 1 illustrates of a portion of a road network.
Figure 2:
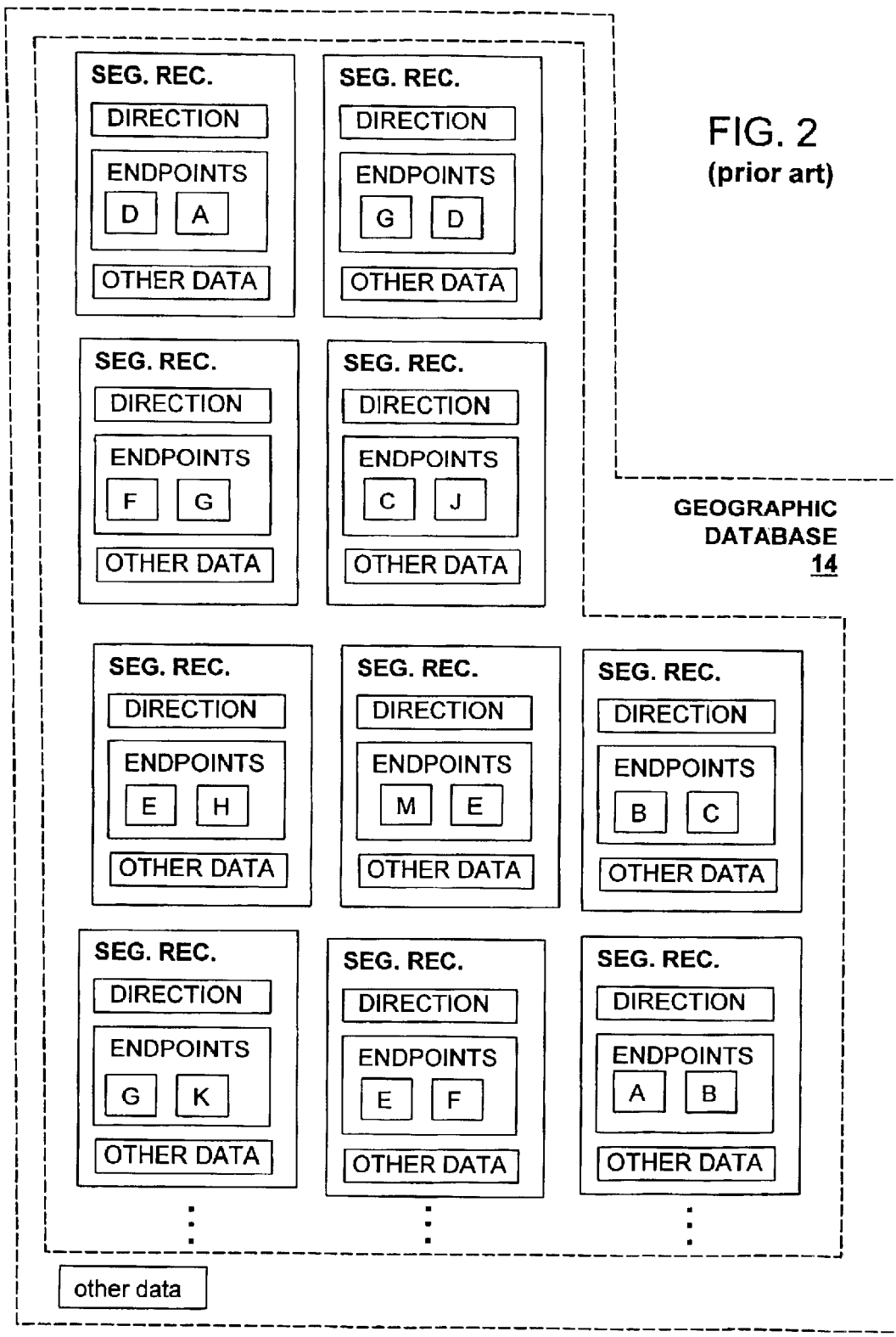
FIG. 2 is a diagram that illutrates how the portion of the road network shown in FIG. 1 is represented in a conventional geographic database.
Figure 7:
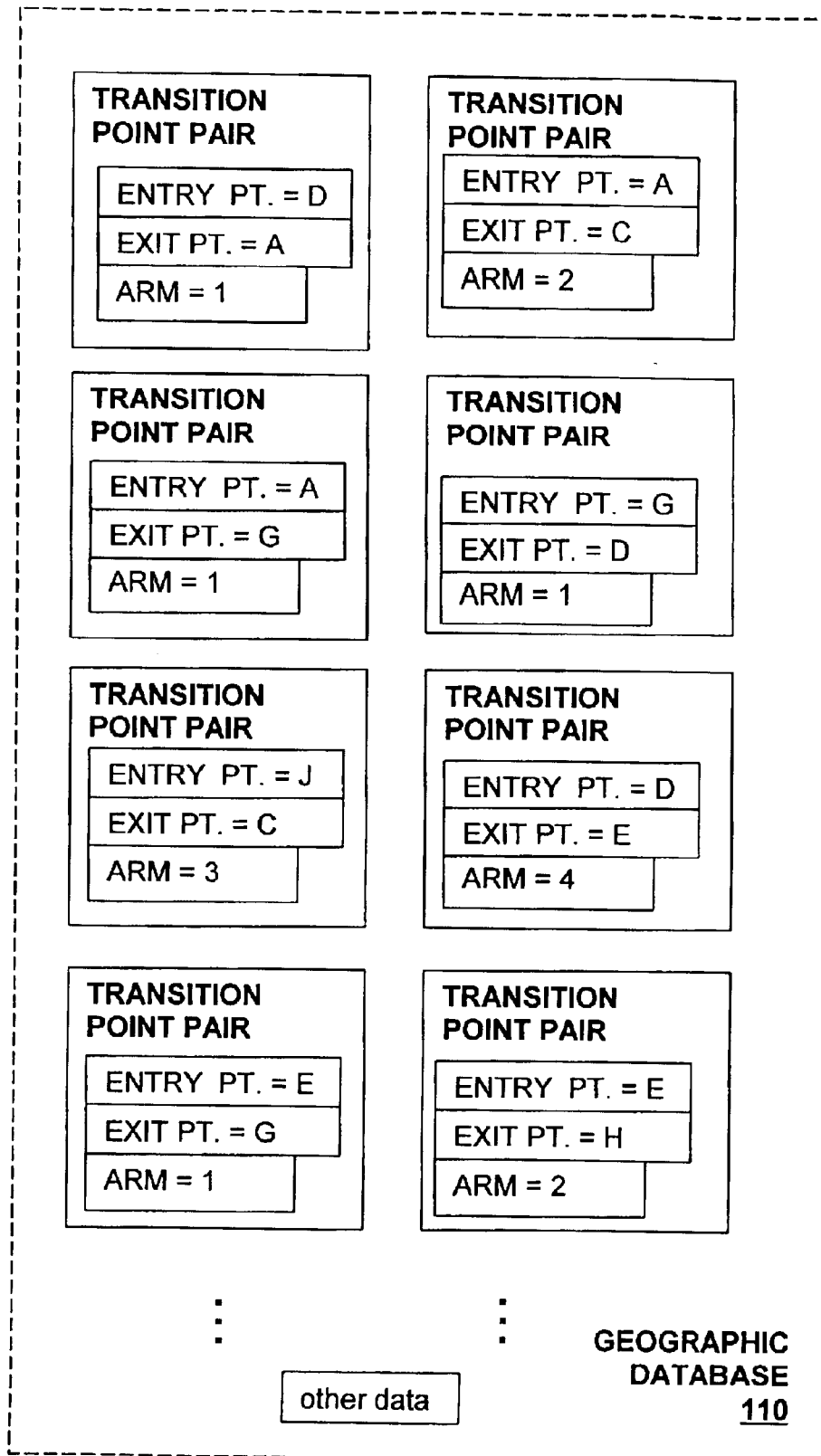
FIG. 7 is a diagram that illutrates how the portion of the road network shown in FIG. 1 is represented in a geographic database according to the first embodiment.

FIG. 7 is a diagram that illutrates how the portion of the road network shown in FIG. 1 would be represented using the present embodiment. Note that in FIG. 7, the transition point pair A–C represents the separate links A–B and B–C. Since the link A–B is a ramp, there is only legal path from the link A–B, i.e., onto the link B–C. Therefore, the intersection at B is not a decision point intersection and the intersection B is not used as the exit point of the transition point pair that starts at A along the arm=2. The next decision point along this path is the intersection C.

Another example in FIG. 7 is the transition point pair A–G. This transition point pair represents the separate links A–F and F–G. No turns are permitted at F, therefore, F is not a decision point intersection. Accordingly, F is not used as the exit point of the transition point pair that starts at A along the arm=1. The next decision point along this path is C.

D. Nodes

As mentioned above, in the present embodiment the subset of data used for route calculation includes node data. Nodes are the end points of links and therefore represent the intersections of roads. The subset of data used for route calculation may include a data record for each node. The node data record may have associated with it information (such as "attributes", "fields", etc.) that allows identification of the link(s) that connect to it and/or its geographic position (e.g., its latitude, longitude, and optionally altitude or elevation).

E. Nominal Paths

The present embodiment uses nominal path data. Nominal paths are attributes of intersections. When forming a geographic database, the geographic database developer identifies a list of nominal paths for each intersection. The nominal paths through an intersection identify, for each road segment by which the represented intersection can be entered, one and only one road segment from which the represented intersection is exited. In a nominal path, the exit segment associated with an entrance segment is not necessarily the only segment from which the intersection can be legally exited. However, when identifying the nominal path, an attempt is made by the geographic database developer to identify that road segment from which the intersection is most likely to be exited, for a given entrance segment. The nominal path data is included in the compiled version (110 in FIG. 4) of the geographic database and may also be included in the master version (100 in FIG. 4) of the geographic database. A further description of nominal paths is included in the copending patent application Ser. No. 09/649,715, entitled "METHOD AND SYSTEM FOR COMPACT REPRESENTATION OF ROUTES," filed Aug. 25, 2000, the entire disclosure of which is incorporated herein by reference.

In a present embodiment, the nominal path data are not included in the subset of data used for route calculation. Instead, the nominal path data are included in another of the subsets of data, e.g., the maneuver or composite subset.

F. Nominal and Variant Transition Point Pairs

There are two types of transition point pairs: a nominal type and a variant type. A nominal transition point pair is one that follows a nominal path through each intersection from the entry point (i.e., start node) to the exit point (i.e., end node). A variant transition point pair does not follow the nominal path at each intersection between its entry point and its exit point. The intersection (i.e., node) at which a variant transition point pair departs from the nominal path is referred to as a "via node." Variant transition point pairs are exceptions to the general rule that transition point pairs start and end at decision point intersections. Variant transition point pairs are used to represent restricted driving maneuvers. Other than at via nodes, the path of a transition point pair between it s entry point and its exit point follows the nominal path at each intersection.

A transition point pair data record that represents a variant transition point pair includes data indicating the via node (e.g., the node ID) and the road segment (i.e., arm) from the via node to follow toward the exit point.

G. Consideration Related to Transition Point Pairs

As mentioned above, transition point pairs normally, but not always, start and end at "decision point intersections." In a present embodiment, if a transition point pair crosses a decision point intersection, there is another transition point pair, with the same start node and arm, for each additional legal path through the decision point intersection. These additional transition point pairs will be variant since they do not follow the nominal path.

Transition point pairs are unidirectional. Each transition point pair data record in the subset of data used for route calculation represents one way to travel from the start node (i.e., the entry point) to the end node (i.e., the exit point). According to the present embodiment, the same path in the reverse direction would be represented by a different transition point pair data record.

The path of a transition point pair can partially or completely overlap the path of another transition point pair. This means that a single link (i.e., road segment) may be part of more than one transition point pair in each direction. A transition point pair that completely overlaps another transition point pair is referred to as a "container."

In one embodiment, the transition point pair records in the compiled database do not have database IDs, i.e., a unique identifier by which each transition point pair record is identifiable in the database. A transition point pair is uniquely defined by its start node ID, start arm and end node ID.

It is not necessary that all of the links (i.e., road segments) that make up a transition point pair be of the same rank.

As mentioned above, in some geographic databases, the subset of data used for route calculation is organized into levels, with each level above the lowest level containing only data that represent roads of a corresponding rank or higher. In a present embodiment, the subset of data used for route calculation is organized into levels. Each level includes transition point pair data as described above.

H. Support for Restricted Driving Maneuvers

Transition point pair data are an effective way to represent multi-segment restricted driving maneuvers. A multi-segment restricted driving maneuver is a traffic restriction that applies to travel onto one road segment from another road segment separated therefrom by one more other road segments. In a present embodiment, multi-segment restricted driving maneuvers are supported by defining all the legal paths through an intersection as transition point pairs representing multi-link segments, but not defining the restricted paths. Time-based conditions are supported by tagging selected segments with a time restriction.

I. Examples

FIGS. 8–12 illustrate graphically the road segments represented by various transition point pair data entities.

Figure 8:
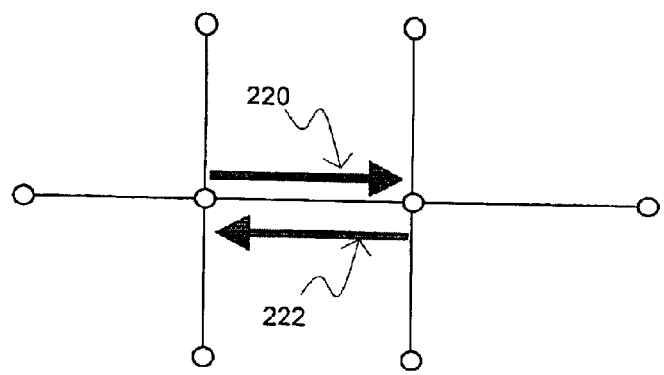
FIGS. 8–12 graphically illustrate how various road segment combinations are represented in the first embodiment.

FIG. 8 shows a common case. Two transition data point pairs 220 and 222 are defined for a single two-way link, one in each direction.

Figure 9:
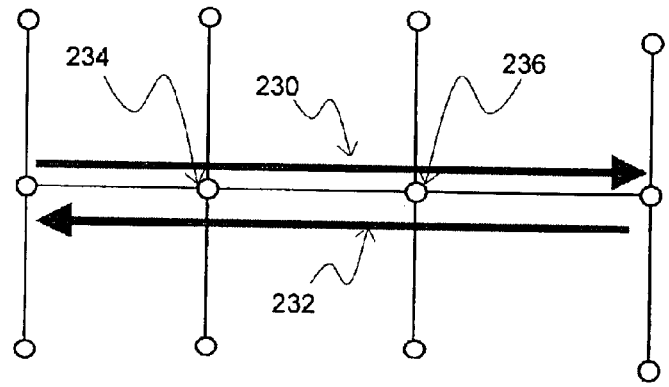

FIG. 9 shows an example of two transition point pairs 230 and 232 that represent several road segments. In this example, no turns are permitted at the intersections 234 and 236.

Figure 10:
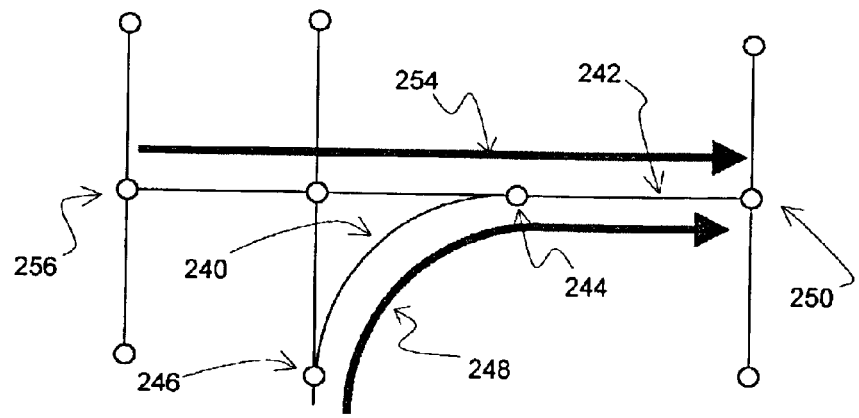

FIG. 10 shows a ramp 240 merging onto a road 242. Since only one path is permitted at the intersection 244 at the end of the ramp 240, the intersection 244 is not a decision point intersection. Therefore, the intersection 244 is not the exit point for the transition point pair 248 starting at 246 along the ramp 240. The exit point is the intersection 250. Note that the link 242 between 244 and 250 is also part of the transition point pair 254 that has an entry point at 256.

Figure 11:
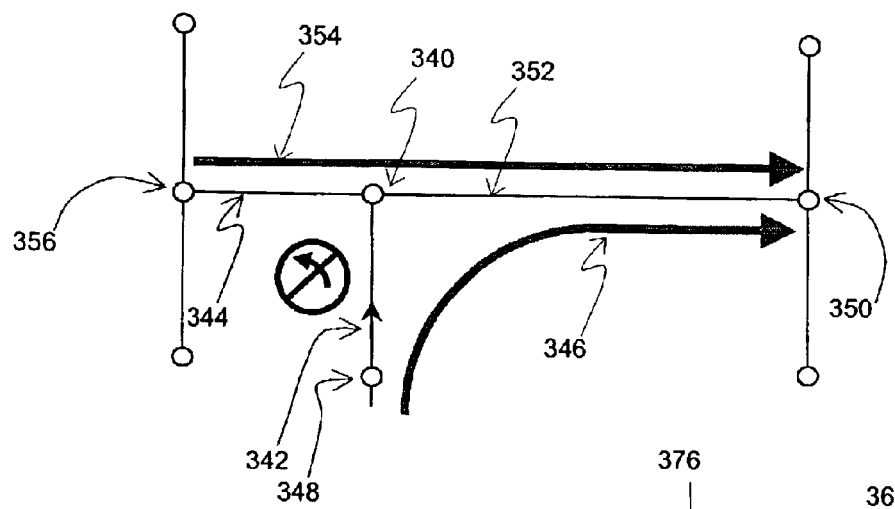

FIG. 11 shows an intersection 340 with no left turn from the segment 342 onto the segment 344. The transition point pair 346 starting at the intersection 348 has its exit point at the intersection 350. Note that the segment 352 between the intersection 340 and the intersection 350 is also part of the transition point pair 354 that has its starting point at the intersection 356 and its exit point at intersection 350.

Figure 12:
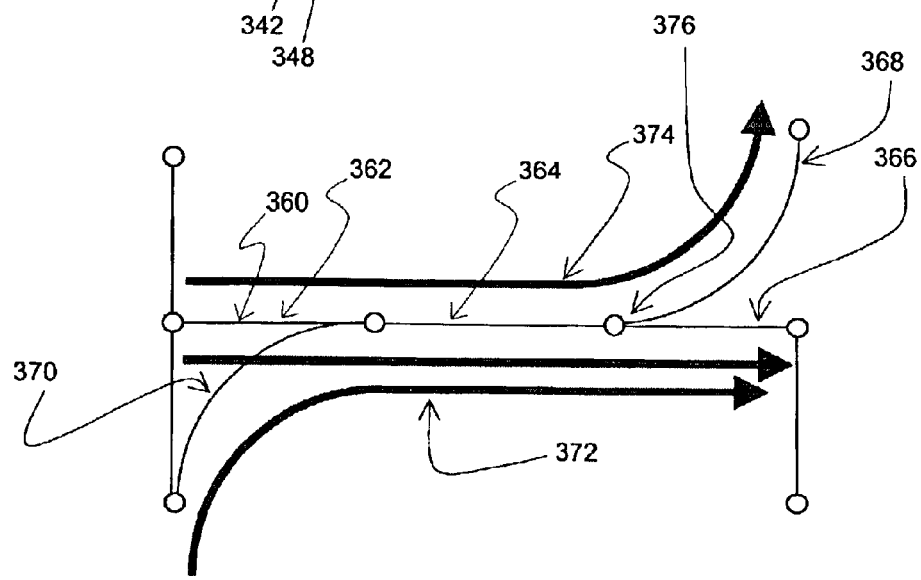

FIG. 12 shows a portion of a road network containing a multi-segment restricted driving maneuver. In FIG. 12, a highway 360 is comprised of road segments 362, 364 and 366. A driver proceeding along the highway 360 from the road segment 362 to the road segment 364 is permitted to either proceed along the highway 360 onto the road segment 366 or may exit along the road segment 368. However, a driver entering the road segment 364 of highway 360 from the ramp 370 is prohibited from exiting the highway 360 along the road segment 368. Instead, a driver entering the road segment 364 from the ramp 370 is permitted to only proceed along the highway 360 onto the road segment 366. The present embodiment models this restriction by not defining a transition point pair that follows the prohibited path. The rest of the paths through the multi-segment restricted driving maneuver intersections are defined. Because of the multi-segment restricted driving maneuver, the transition point pairs 372 and 374 cross over a decision point intersection, i.e., the intersection 376. Without the multi-segment restricted driving maneuver, the transition point pairs would end at the intersection 376.

J. Complex Intersections (Connector Links)

One alternative embodiment includes a way to represent certain types of complex intersections to facilitate calculation of routes. Complex intersections include intersections that have several separate links (segments) that represent vehicle travel paths internal of the intersection. These internal (or connector) links may represent actual physical road segments or may represent merely vehicle paths across the intersection. An example of a complex intersection includes the intersection of two multi-digitized roads.

According to this alternative, when representing the road segments that lead into and out of a complex intersection, the transition point pairs will exclude the internal links. Thus, the transition point pair that represents a road segment that leads into a complex intersection will end at an entry node into the complex intersection and the transition point pair that represents a road segment that leads our of a complex intersection will begin at an exit node leading out of the complex intersection. Because of this way of representing road segments leading into and out of complex intersections, a transition point pair that leads into or out of a complex intersection may not share a node with its successor (or predecessor) transition point pair.

An exception to this way of representing road segments that lead into or out of complex intersections applies to complex intersections that include multi-segment restricted driving maneuvers. A transition point pair that represents multiple segments of a restricted driving maneuver that spans a complex intersection will represent the segments internal of the complex intersection. If the transition across the complex intersection follows the nominal path, it is not necessary to include any information about the connector links. The distance and time associated with connector links will be included in the transition distance and time routing attributes. Any links where the transition path across a complex intersection deviates from the nominal path are stored as via nodes (as explained above). These via nodes are attributes of the intersection transition; but are not part of any transition point pair. They can be stored in a table and referenced from a table that indicates the successors of a transition point pair. Data indicating a maneuver type included in the table takes into account any connector links.

FIGS. 13A–13D are examples of intersections with connector links, shown as dashed lines. FIG. 13A shows a multi-digitized intersection. FIG. 13B shows a multi-digitized T intersection. FIG. 13C shows a turn lane. FIG. 13D shows a transition from a multi-digitized to single-digitized road.

K. Using the Decision Point Pairs for Routing

Transition point pair data can be used with known techniques for route calculation. When determining a route, the transition point pair data are used to identify which other points can be reached from a given point. Using known route calculation techniques, these reachable points are evaluated to determine which one or more of them should be considered for inclusion, in a potential solution route. Then, the transition point pair data are used again to determine further reachable points, which are then evaluated, and so on. The data are used iteratively until a list of connected transition point pairs connecting an origin and destination is found. The transition point pair data can be used to search in either direction, i.e., from the origin toward the destination or from the destination back toward the origin. Techniques for route calculation are disclosed in U.S. Pat. No. 6,192,314, the entire disclosure of which is incorporated by reference herein.

The successful result of the route calculation process is a list containing a sequence of connected transition point pairs connecting the origin and destination. As mentioned above, transition point pair data do not indicate the specific road segments by which the exit point can be reached from the entry point. Accordingly, the list containing the sequence of connected transition point pairs connecting the origin and destination represents only the skeleton of an actual solution route. After this skeleton route is determined, the skeleton route is expanded to determine all the separate individual road segments that correspond to the transition point pairs. The entire skeleton route does not need to be expanded at once. For example, only a few links ahead of the current position of the vehicle may be expanded at one time.

In order to expand the skeleton route, the navigation system includes an application that uses another of the subsets of data in the geographic database. In one embodiment, this application uses the composite subset. The composite subset of data includes data used for vehicle positioning, route guidance and geocoding.

Starting with the first transition point pair data record in the solution route, the composite subset of data is used to determine which actual road segment corresponds to the exit arm from the entry point of the first transition point pair. The rest of the actual road segments that correspond to the first transition point pair data record are determined by (1)

identifying the node at the other end of the actual road segment that corresponds to the exit arm of the entry point and (2) using the nominal path data to determine the rest of the actual road segments that correspond to the first transition point pair data record until the exit point of the first transition point pair data record is reached. If the first transition point pair data record is a variant type, then the via node data is used to determine which actual road segment corresponds to the transition point pair where the nominal path is not followed at an intersection.

The road segment upon which the origin is located is determined (e.g., using shape point data associated with the road segment records in the composite subset of data). This road segment and the rest of the road segments that correspond to the first transition point pair up to the exit point of the first transition point pair are stored in an expanded (full) version of the solution route. Then, the actual road segments that correspond to the next transition point pair in the skeleton solution route are determined. These actual road segments are determined in the same manner as described above in connection with the first transition point pair data record. These actual road segments are then included in the expanded (full) version of the solution route. Then, the actual road segments that correspond to the next transition point pair in the skeleton solution route are determined, and so on, until the exit point of the last transition point pair in the skeleton solution route is reached. The road segment upon which the destination is located is determined in the same manner as described above in connection with the origin.

Once all the actual road segments that correspond to the skeleton route are determined, the expanded (full) version of the solution route includes a list of actual road segments that connect the origin and destination. This list can be used for generating route guidance, displaying a map visually with the route highlighted on the map, and other purposes.

It is intended that the foregoing detailed description be regarded as illustrative rather than limiting and that it is understood that the following claims including all equivalents are intended to define the scope of the invention.

I claim:

1. A method of determining a route with a geographic database that represents a road network, wherein the method comprises:

using a subset of the geographic database that includes transition point pair data to determine a skeleton solution route between an origin and a destination;

wherein the transition point pair data include data entities, each of which indicate an entry point, a road segment leading away from the entry point, an exit point, and attributes that indicate a cost of travel between the entry point and the exit point;

and further wherein each entry point and exit point correspond are decision point intersections, wherein a decision point intersection is an intersection of at least three road segments at which a driver entering the intersection along one of said at least three road segments has a choice of legally exiting the intersection along at least two other of said at least three road segments; and using another subset of the geographic database to determine each road segment that corresponds to the skeleton solution route.

2. The method of claim 1 wherein said other subset includes data that indicate nominal paths through intersections, wherein each nominal path indicates one default road segment along which an intersection can be exited for each road segment along which the intersection can be entered.

3. A method of representing a network of road segments located in a geographic region to facilitate calculation of routes along said road segments, wherein the method comprises:

forming and storing data representations of transition point pairs, wherein each transition point pair includes an entry point and an exit point, wherein the entry point corresponds to a decision point intersection, wherein a decision point intersection is an intersection of at least three road segments wherein a vehicle entering the intersection on one of the road segments can legally exit the intersection on at least two other road segments, and wherein the exit point corresponds to the first eligible decision point intersection along a path of one or more connected road segments in a single legal direction of travel from the entry point; and continuing to form and store the data representations of transition point pairs until all the transition point pairs are represented that include entry points corresponding to intersections used as entry points for at least two transition point pairs.

4. The method of claim 3 further comprising:

forming data representations of transition point pairs to represent multi-segment restricted driving maneuvers, wherein each data representation of a transition point pair involving a restricted driving maneuver represents only the legal paths of travel across the multi-segment restricted driving maneuver.

5. The method of claim 3 further comprising:

storing said data representations of transition point pairs in a subset of a database used for determining routes between locations along said network of road segments.

6. The method of claim 3 further comprising:

storing data representations of end points of road segments.

7. The method of claim 3 further comprising:

storing said data representations of transition point pairs in a first subset of a database, wherein the first subset is used for determining routes between locations along said network of road segments; and forming a second subset of the geographic database, wherein the second subset includes data that represent individual road segments, and wherein said second subset is used to determine which of said individual road segments correspond to transition point pairs.

8. The method of claim 3 further comprising:

forming and storing nominal path data in a database with said data representations of transition point pairs, wherein said nominal path data indicate nominal paths through intersections, wherein each nominal path indicates one default road segment along which an intersection can be exited for each road segment along which the intersection can be entered.

9. The method of claim 3 further comprising:

forming and storing nominal path data in a database with said data representations of transition point pairs, wherein said nominal path data indicate nominal paths through intersections, wherein each nominal path indicates one default road segment along which an intersection can be exited for each road segment along which the intersection can be entered; and storing in the data representations of those transition point pairs that deviate from nominal paths through intersections located between entry points and exit points thereof, data indicating the nodes at which such deviations occur and which road segments to follow from such nodes.

10. The method of claim 3 wherein an eligible decision point intersection is a decision point intersection that is not part of a restricted driving maneuver, a start of a one-way condition in a direction opposite to the direction toward the exit point, a start of a timed one-way condition, or a start of a no-through-traffic condition.

11. The method of claim 3 further comprising:

storing the data representations of transition point pairs on a computer-readable storage medium.

12. A geographic database that represents a road network located in a geographic area, wherein the geographic database comprises:

data entities that represent transition point pairs, wherein each of said data entities that represents a transition point pair comprises data that indicate an entry point, a road segment leading away from the entry point, an exit point, and a travel cost for traveling from the entry point to the exit point along the road segment leading away from the entry point, wherein each entry point and exit point are decision point intersections, wherein a decision point intersection is an intersection of at least three road segments at which a driver entering the intersection along one of said at least three road segments has a choice of legally exiting the intersection along one at least two other of said at least three road segments;

wherein the exit point corresponds to the first eligible decision point intersection along a path of one or more connected road segments in a single legal direction of travel from the entry point along the identified road segment leading away from the entry point; and node data entities that represent end points of individual road segments.

13. The invention of claim 12 wherein said geographic database is stored on a computer-readable medium.

14. The invention of claims 12 further comprising:

nominal path data that indicate for each road segment along which each intersection can be legally entered one and only one default road segment from which the intersection can be exited.

15. The invention of claim 14 wherein said transition point pairs include a nominal type and a variant type, wherein the nominal type of transition point pair corresponds to road segments that follow the nominal path from the entry point thereof to the exit point thereof; and wherein the variant type of transition point pairs correspond to road segments that do not follow the nominal path at each intersection between the entry point thereof and the exit point thereof.

16. The invention of claim 15 wherein each data entity that represents a variant transition point pair includes data that identify each intersection at which a path of travel along road segments from the entry point thereof to the exit point thereof deviates from the nominal path defined therefor and further that identify the road segment to follow from said intersection to reach the exit point.

17. A geographic database that represents a road network located in a geographic area, wherein the geographic database comprises:

a first subset of data used for route calculation comprising:

data entities that represent transition point pairs, wherein each of said data entities that represent a transition point pair comprises data that indicate an entry point, a road segment leading away from the exit point, an exit point, and a travel cost for traveling from the entry point to the exit point along the road segment leading away from the entry point, wherein each entry point and exit point are decision point intersections, wherein a decision point intersection is an intersection of at least three road segments at which a driver entering the intersection along one of said at least three road segments has a choice of legally exiting the intersection along one at least two other of said at least three road segments; and node data entities that represent end points of individual road segments; and a second subset of data used to determine road segments that correspond to transition point pairs, wherein said second subset of data includes nominal path data that indicate for each road segment along which each intersection can be legally entered one and only one default road segment from which the intersection can be exited.

18. The invention of claim 17 wherein said geographic database is stored on a computer-readable medium.

19. The invention of claim 17 wherein said transition point pairs include a nominal type and a variant type, wherein the nominal type of transition point pairs correspond to road segments that follow the nominal path from the entry point to the exit point; and wherein the variant type of transition point pairs correspond to road segments that do not follow the nominal path at each intersection between the entry point and the exit point.

20. The invention of claim 19 wherein each data entity that represents a variant transition point pair includes data that identify each intersection at which a path of travel along road segments from the entry point to the exit point deviates from the nominal path defined therefor and further that identify the road segment to follow from said intersection to reach the exit point.

21. The invention of claim 17 wherein each data entity that represents a transition point pair includes data that identify the road segment which corresponds to the transition point pair and which is connected directly to the exit point.

* * * * *